United States Patent
Deguchi et al.

(10) Patent No.: US 12,506,152 B2
(45) Date of Patent: Dec. 23, 2025

(54) NONAQUEOUS ELECTROLYTE RECHARGEABLE BATTERY AND METHOD FOR MANUFACTURING POSITIVE PLATE OF NONAQUEOUS ELECTROLYTE RECHARGEABLE BATTERY

(71) Applicants: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Shotaro Deguchi, Toyohashi (JP); Kazutaka Yoshikawa, Hamamatsu (JP); Yoshinori Kudo, Toyohashi (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 427 days.

(21) Appl. No.: 18/072,595

(22) Filed: Nov. 30, 2022

(65) Prior Publication Data
US 2023/0178736 A1  Jun. 8, 2023

(30) Foreign Application Priority Data
Dec. 3, 2021 (JP) .................................. 2021-197141

(51) Int. Cl.
*H01M 4/62* (2006.01)
*H01M 4/02* (2006.01)
(Continued)

(52) U.S. Cl.
CPC ............ *H01M 4/62* (2013.01); *H01M 4/0404* (2013.01); *H01M 4/139* (2013.01); *H01M 2004/021* (2013.01); *H01M 2004/028* (2013.01)

(58) Field of Classification Search
CPC ....... H01M 4/62; H01M 4/0404; H01M 4/139; H01M 2004/021; H01M 2004/028;
(Continued)

(56) References Cited

U.S. PATENT DOCUMENTS

| 2015/0132659 A1* | 5/2015 | Tanaka .............. H01M 10/4235 |
| | | 429/246 |
| 2020/0328425 A1* | 10/2020 | Yamada ................ H01M 4/628 |
| 2023/0111688 A1 | 4/2023 | Matsuda et al. |

FOREIGN PATENT DOCUMENTS

| JP | 2009-037833 A | 9/2009 |
| JP | 2017-050102 A | 3/2017 |

(Continued)

OTHER PUBLICATIONS

Japanese Office Action issued in corresponding application No. 2021-197141, dated Nov. 28, 2023.

*Primary Examiner* — Lisa S Park
(74) *Attorney, Agent, or Firm* — Maschoff Brennan

(57) ABSTRACT

A nonaqueous electrolyte rechargeable battery includes a positive plate, a negative plate, a separator that insulates the positive plate from the negative plate, and a nonaqueous electrolytic solution. The positive plate includes a positive current collector, a positive composite layer disposed on a portion of a surface of the positive current collector and containing a positive active material particle, and an insulation protective layer disposed on another portion of the surface of the positive current collector adjacent to the positive composite layer and containing an insulation particle. The insulation protective layer has a smaller thickness
(Continued)

than the positive composite layer. The insulation protective layer has a greater porosity than the positive composite layer.

3 Claims, 7 Drawing Sheets

(51) Int. Cl.
*H01M 4/04* (2006.01)
*H01M 4/139* (2010.01)

(58) Field of Classification Search
CPC ............... H01M 4/131; H01M 10/052; H01M 10/0525; H01M 10/058; H01M 10/0585; H01M 10/4235; H01M 50/46; H01M 4/13; H01M 4/0419; Y02E 60/10; Y02P 70/50
See application file for complete search history.

(56) References Cited

FOREIGN PATENT DOCUMENTS

| | | | |
|---|---|---|---|
| JP | 2017050102 | * | 3/2017 |
| JP | 2020-173941 A | | 10/2020 |
| WO | 2015/156213 A1 | | 10/2015 |
| WO | WO2015156213 | * | 10/2015 |
| WO | 2021/199684 A1 | | 10/2021 |

* cited by examiner

NONAQUEOUS ELECTROLYTE RECHARGEABLE BATTERY AND METHOD FOR MANUFACTURING POSITIVE PLATE OF NONAQUEOUS ELECTROLYTE RECHARGEABLE BATTERY

BACKGROUND

1. Field

The following description relates to a nonaqueous electrolyte rechargeable battery and a method for manufacturing a positive plate of a nonaqueous electrolyte rechargeable battery, and more specifically, a nonaqueous electrolyte rechargeable battery and a method for manufacturing a positive plate of a nonaqueous electrolyte rechargeable battery that limits high-rate deterioration.

2. Description of Related Art

A nonaqueous electrolyte rechargeable battery such as a lithium-ion rechargeable battery is lightweight and has a high energy density and thus is preferably used as, for example, a high-output power supply mounted on a vehicle. The nonaqueous electrolyte rechargeable battery includes a power storing element having a structure such that a positive electrode and a negative electrode are insulated by a separator or the like. The power storing element is laminated or rolled in a cylindrical or elliptic shape to form a rolled electrode body and accommodated in a battery case. The positive electrode and the negative electrode of a typical electrode body are designed so that a negative composite layer has a larger dimension than a positive composite layer in the width-wise direction. Thus, the negative composite layer faces, via the separator, a positive current collector that is free of the positive composite layer and exposes metal. In a normal case, because of the arrangement of the separator, the negative composite layer does not form a short circuit with the positive current collector exposing metal. However, when metal deposits on the negative electrode or fine metal powder collects on the negative electrode, it may penetrate the separator and form a short circuit to produce heat. To prevent such a short circuit, there is disclosure of a positive current collector that includes an insulation protective layer containing inorganic filler. The insulation protective layer is formed on a surface of the positive current collector along an end of a positive active material layer. Japanese Laid-Open Patent Publication Nos. 2009-037833 and 2020-173941 describe that the insulation protective layer prevents a short circuit between the positive current collector and an end of the negative composite layer opposed to the positive current collector.

When the insulation protective layer is provided in this manner, the insulator covers a metal plate that forms the positive current collector. Thus, even when metal lithium (Li) deposits or a foreign object such as fine metal powder encroaches, short-circuiting with the negative composite layer through the separator is effectively prevented.

In International Patent Publication No. WO2015/156213, when an electrode substrate is fed at a predetermined speed, an electrode material is applied to the electrode substrate, and a first insulative material is also applied to portions adjacent to opposite sides of the electrode material in a direction orthogonal to the feeding direction of the electrode substrate. In addition, an insulative material is applied as a second separator to the surfaces of the electrode material and the first insulative material that have been applied. Subsequently, the applied electrode material and the applied first and second insulative materials are dried and solidly adhered.

FIG. 12 is a schematic view of an electrode body 12 disclosed in International Patent Publication No. WO2015/156213. According to International Patent Publication No. WO2015/156213, paste for forming an insulation protective layer 34 and paste for forming a positive composite layer 32 are substantially simultaneously applied, simultaneously dried and solidly adhered, and pressed. Thus, the application of paste is performed with a single workstation in a single step and thus requires a lesser amount of work. In addition, the boundary portion between the insulation protective layer 34 and the positive composite layer 32 is less likely to include an overlap or a step.

When a nonaqueous electrolyte rechargeable battery is charged and discharged at a high rate, if the electrolyte does not sufficiently move in the cell battery, the concentration of the electrolyte becomes uneven. This may cause deterioration of the battery, which is referred to as "high-rate deterioration".

With the invention disclosed in International Patent Publication No. WO2015/156213, the insulation protective layer and the positive composite layer have the same thickness. The insulation protective layer lowers the efficiency of movement of the electrolyte in the nonaqueous electrolyte solution in the positive composite layer.

With the invention disclosed in International Patent Publication No. WO2015/156213, the paste for the insulation protective layer is mixed with the paste for the positive composite layer in the boundary portion when applied. This forms a mixture layer. The mixture layer contains a positive active material even though the ratio of the positive active material in the mixture layer is lower than the ratio of the positive active material in the positive composite layer. It is desirable that the positive active material in the mixture layer be used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is a nonaqueous electrolyte rechargeable battery that includes a positive plate, a negative plate, a separator that insulates the positive plate from the negative plate, and a nonaqueous electrolytic solution. The positive plate includes a positive current collector, a positive composite layer disposed on a portion of a surface of the positive current collector and containing a positive active material particle, and an insulation protective layer disposed on another portion of the surface of the positive current collector adjacent to the positive composite layer and containing an insulation particle. The insulation protective layer has a smaller thickness than the positive composite layer. The insulation protective layer has a greater porosity than the positive composite layer.

In the nonaqueous electrolyte rechargeable battery described above, the positive composite layer and the insulation protective layer may overlap to define a boundary portion. The nonaqueous electrolyte rechargeable battery may further include a mixture layer in which the positive composite layer and the insulation protective layer are mixed in the boundary portion. At least a portion of the mixture layer may be compressed.

In the nonaqueous electrolyte rechargeable battery described above, wherein the porosity of the insulation protective layer may be 45% to 65%.

In the nonaqueous electrolyte rechargeable battery described above, wherein the porosity of the positive composite layer may be 30% to 50%.

In the nonaqueous electrolyte rechargeable battery described above, wherein the insulation particle may include boehmite or alumina.

An aspect of the present disclosure is a method for manufacturing a positive plate of a nonaqueous electrolyte rechargeable battery. The nonaqueous electrolyte rechargeable battery includes the positive plate, a negative plate, a separator insulating the positive plate from the negative plate, and a nonaqueous electrolytic solution. The positive plate includes a positive current collector, a positive composite layer disposed on a portion of a surface of the positive current collector and containing a positive active material particle, and an insulation protective layer disposed on another portion of the surface of the positive current collector adjacent to the positive composite layer. The insulation protective layer has a smaller thickness than the positive composite layer. The insulation protective layer has a greater porosity than the positive composite layer. The method includes coating, simultaneously, the surface of the positive current collector with an insulation protective paste including an insulation particle, a binder, and a solvent and a positive composite paste including a positive active material particle, a conduction support, a binder, and a solvent using a nozzle, thereby forming the positive composite layer and the insulation protective layer disposed adjacent to each other.

The method described above may further include pressing the positive composite layer. The insulation protective paste coated in the coating may be set to have a smaller thickness than the positive composite layer after the pressing.

In the method described above, the positive composite layer and the insulation protective layer may overlap to define a boundary portion. The positive composite paste may be mixed with the insulation protective paste to form a mixture layer in the boundary portion. The pressing may include pressing the positive composite layer and at least a portion of the mixture layer together without compressing the insulation protective layer.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Overview of Present Embodiment

Problem in Prior Art

Figure 12:
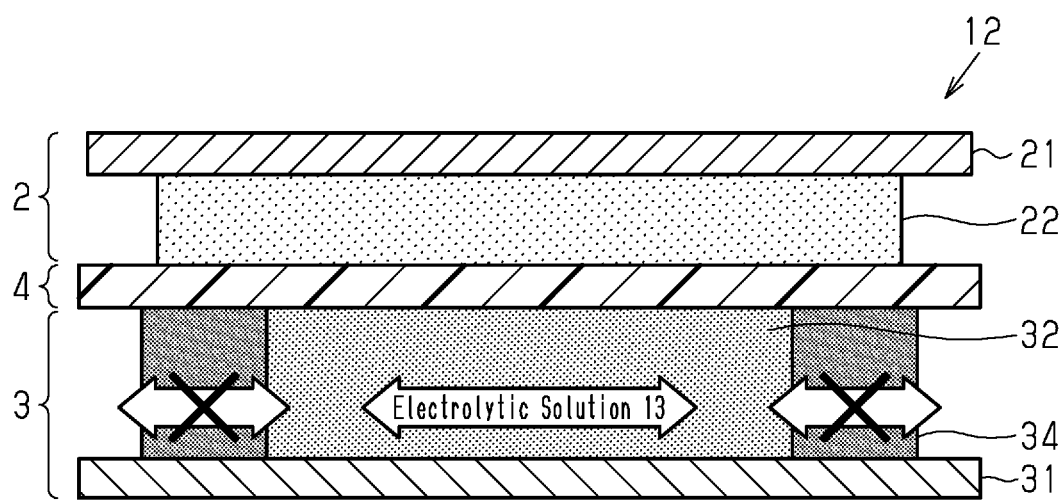
FIG. 12 is a schematic diagram of an electrode body in a prior art after a pressing step.

FIG. 12 is a schematic diagram of an electrode body 12 in a prior art after a pressing step. For example, in the prior art disclosed in International Patent Publication No. WO2015/156213, a negative plate 2 and a positive plate 3 are stacked with a separator 4 disposed between the negative plate 2 and the positive plate 3. The positive plate 3 includes a positive current collector 31, which is formed of an aluminum (Al) thin plate and serves as a substrate, and a positive composite layer 32 formed on the positive current collector 31. An insulation protective layer 34 is adjacently disposed on opposite ends of the positive composite layer 32. The upper surface of the positive composite layer 32 is flush with the upper surface of the insulation protective layer 34, which is disposed on opposite ends of the positive composite layer 32. The separator 4 is disposed on the upper surfaces of the positive composite layer 32 and the insulation protective layer 34.

In the coating step of the prior art, the positive current collector 31 is coated with a positive composite paste 32a and an insulation protective paste 34a so that the insulation protective paste 34a is disposed adjacent to opposite ends of the positive composite paste 32a. In the pressing step, the positive composite layer 32 and the insulation protective layer 34, which are disposed on opposite ends of the positive composite layer 32, are simultaneously pressed.

In the prior art, the pressing step adjusts the thickness of the positive plate 3 and reshapes the surface of the positive plate 3 so that the surface becomes flat. In this step, the porosity [%] of the positive composite layer 32 is decreased.

Porosity P [%]

The porosity P [%] refers to a measure indicating an amount of the void space such as an inter-particle void. In general, the porosity P [%] is proportional to the coefficient of permeability. In the present embodiment, the porosity P [%] is used as an index indicating the efficiency of an electrolytic solution 13 flowing to the positive composite layer 32 in a cell.

The porosity P [%] is also used as an index indicating the distance between positive active material particles 32b in the positive composite layer 32.

In an example, the porosity P [%] is measured by an immersion process that immerses a porous specimen in a liquid having high wettability and saturates the void space with the liquid. In an example, the porosity P [%] may be measured by an optical process that determines the area of substances and the area of visible void space through microscopic observation of a cross section of a specimen. In an example, the porosity P [%] may be measured by mercury porosimetry that measures a pressure amount corresponding to the amount of external pressure applied to intrude mercury, which has high surface tension, into pores, thereby obtaining the distribution of pore diameters and the volume of empty pores.

Change in Porosity P [%] in Pressing Step

When the porosity P [%] is decreased in the positive composite layer 32, the distance between the positive active material particles 32b in the positive composite layer 32 is decreased. This improves the conductive path and increases the battery efficiency.

However, with the invention described in International Patent Publication No. WO2015/156213, the insulation protective layer 34 is also pressed and compressed. This decreases the distance between insulation particles 34b contained in the insulation protective layer 34. As a result, the porosity P [%] decreases. A decrease in the porosity P [%] lowers the efficiency of exchange of the electrolytic solution 13 of the positive composite layer 32. Particularly, during charging or discharging at a high rate, this causes uneven concentration of the electrolytic solution 13 in the battery and easily results in deterioration of the battery, which is referred to as "high-rate deterioration".

High-Rate Deterioration Limiting Structure of Present Embodiment

Figure 6:
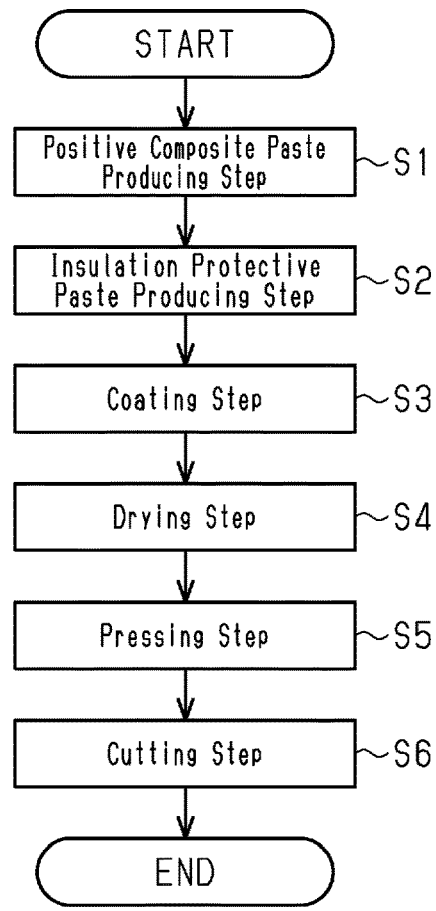
FIG. 6 is a flowchart showing a method for manufacturing a positive plate of the embodiment.

FIG. 6 shows a method for manufacturing the positive plate 3 of a lithium-ion rechargeable battery 1 of the present embodiment. In a coating step (S3), the insulation protective paste 34a and the positive composite paste 32a are simultaneously applied to the surface of the positive current collector 31 with a coater 5. The simultaneous coating forms the positive composite layer 32 and the insulation protective layer 34 located adjacent to each other. The thickness of the insulation protective paste 34a applied in the coating step is set to be smaller than the thickness of the positive composite layer 32 after a pressing step (S5).

Such a coating forms a mixture layer M in a boundary portion B in which the positive composite paste 32a overlaps the insulation protective paste 34a.

In the pressing step (S5), pressing is performed as shown in FIGS. 9A, 9B, 10A, and 10B. More specifically, the positive composite layer 32 and at least a portion of the mixture layer M, in which the positive composite paste 32a is mixed with the insulation protective paste 34a, are pressed together from a thickness D1 to a thickness D2. At this time, the insulation protective layer 34 having a thickness D3 is not compressed.

In an example, the average concentration of insulative materials contained in the mixture layer M may be specified as 30% to 70% of the average concentration of insulative materials contained in the insulation protective layer 34. Also, the average concentration of electrode active materials contained in the mixture layer M may be specified as 30% to 70% of the average concentration of electrode active materials in the positive composite layer 32.

In the present embodiment of the method for manufacturing the positive plate 3 of the lithium-ion rechargeable battery 1, the porosity P [%] of the insulation protective layer 34 is greater than the porosity P [%] of the positive composite layer 32. In the positive plate 3, the porosity P [%] of the insulation protective layer 34 is set to 45% to 65%, and the porosity P [%] of the positive composite layer 32 is set to 30% to 50%.

With such a structure, the flow of the electrolytic solution 13 is not hindered during the high-rate charging and discharging. The positive active material particles 32b in the mixture layer M are also used. These structures effectively limit high-rate deterioration, thereby improving the battery efficiency.

Configuration of Present Embodiment

Structure of Lithium-Ion Rechargeable Battery 1

Figure 1:
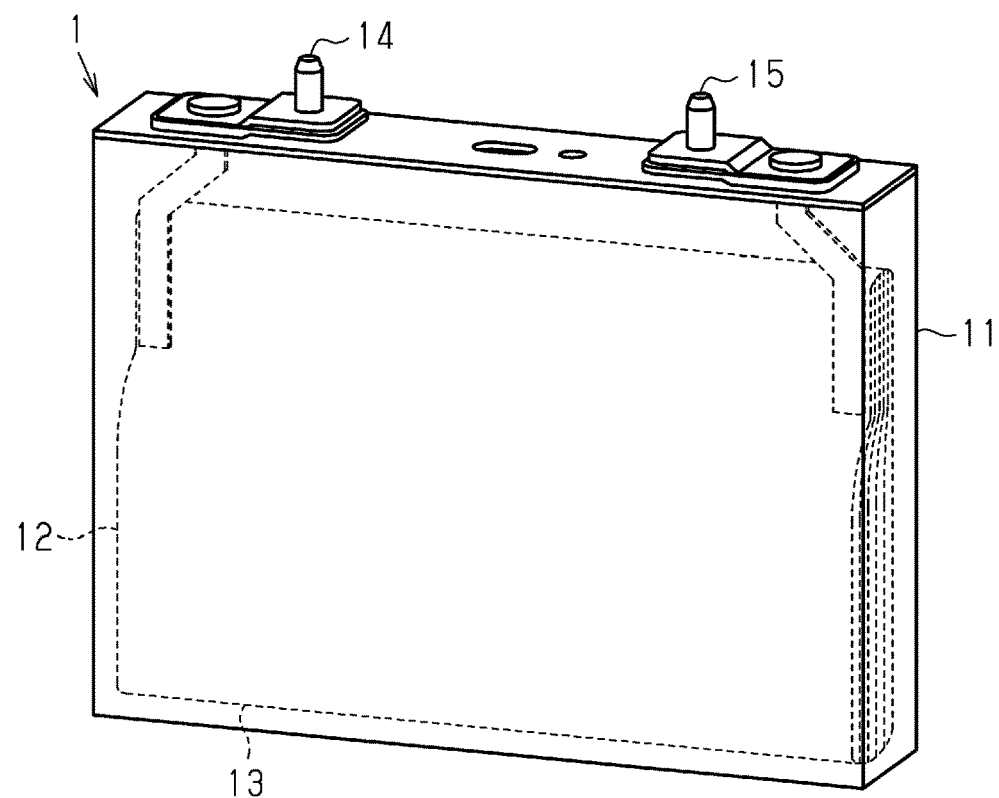
FIG. 1 is a schematic perspective view showing the structure of a lithium-ion rechargeable battery in an embodiment.

FIG. 1 is a schematic perspective view showing the structure of a lithium-ion rechargeable battery 1 in the present embodiment. The structure of the lithium-ion rechargeable battery 1 of the present embodiment will now be described.

As shown in FIG. 1, the lithium-ion rechargeable battery 1 includes a cell battery. The lithium-ion rechargeable battery 1 includes a rectangular-box-shaped battery case 11 having an upper opening. The battery case 11 accommodates an electrode body 12. The battery case 11 is filled with an electrolytic solution 13 through a liquid inlet. The battery case 11 is formed of metal such as an aluminum alloy and includes a hermetic battery container. The lithium-ion rechargeable battery 1 further includes a positive external terminal 14 and a negative external terminal 15 that are used when charging and discharging power. The shapes of the positive external terminal 14 and the negative external terminal 15 are not limited to those shown in FIG. 1.

Electrode Body 12

Figure 2:
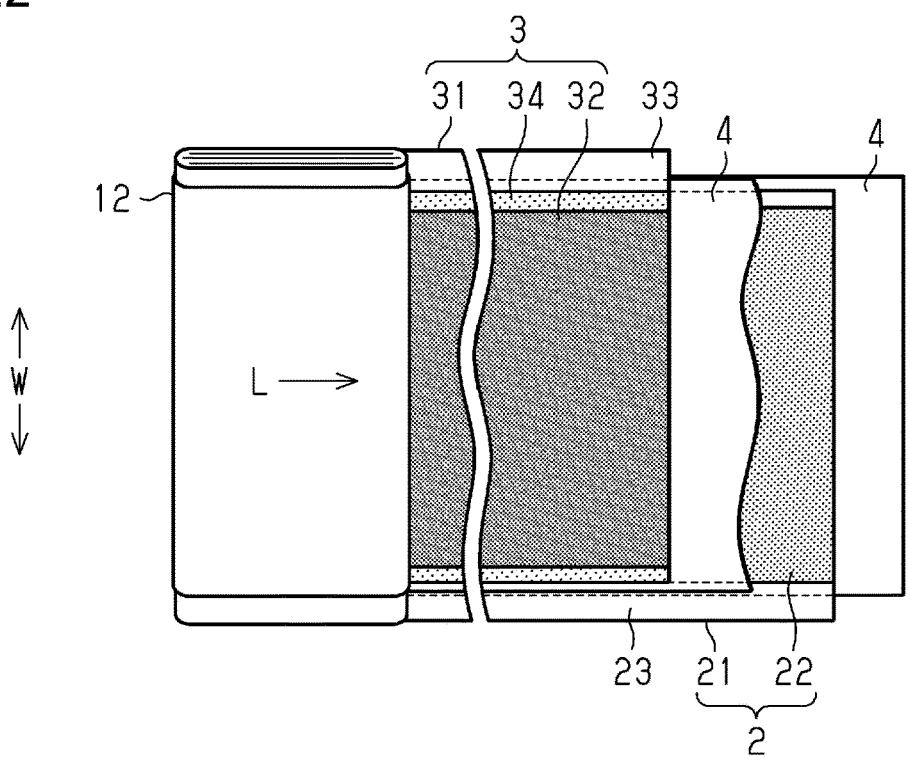
FIG. 2 is a schematic diagram showing the structure of a rolled electrode body of the embodiment.

FIG. 2 is a schematic diagram showing the structure of the rolled electrode body 12. The electrode body 12 includes a negative plate 2, a positive plate 3, and separators 4 disposed between the negative plate 2 and the positive plate 3 that are rolled to have a low profile. The negative plate 2 includes a negative current collector 21, which serves as a substrate, and a negative composite layer 22 formed on the negative current collector 21. A negative connector 23 is disposed at one end in a width-wise direction W (roll axial direction)

that is orthogonal to a rolling direction (roll direction L). The negative connector 23 is free of the negative composite layer 22 and exposes the negative current collector 21. The direction in which the electrode body 12 (the negative plate 2, the positive plate 3, and the separator 4) is rolled is referred to as the roll direction L of the electrode body 12. The direction orthogonal to the roll direction L of the electrode body 12 is referred to as the width-wise direction W (roll axial direction) of the electrode body 12. The negative plate 2 includes the negative connector 23, which is disposed on one end of the negative plate 2 in the width-wise direction W (roll axial direction) of the electrode body 12. The negative composite layer 22 is not formed on the negative current collector 21 of the negative connector 23. Thus, the negative current collector 21 is exposed on the negative connector 23.

The positive plate 3 includes a positive current collector 31, which serves as a substrate, and the positive composite layer 32 formed on the positive current collector 31. As shown in FIG. 2, a positive connector 33 is disposed at the other end (opposite to the negative connector 23) in the width-wise direction W (roll axial direction), which is orthogonal to the direction in which the positive current collector 31 is rolled (the roll direction L). In other words, the positive plate 3 includes the positive connector 33 disposed at an end of the positive plate 3 opposite to the negative connector 23 of the negative plate 2 in the width-wise direction W (roll axial direction) of the electrode body 12. The positive composite layer 32 is not formed on the positive current collector 31 of the positive connector 33 so that the metal of the positive current collector 31 is exposed.

In the present embodiment, the positive plate 3 further includes the insulation protective layer 34 that is disposed adjacent to the end of the positive composite layer 32 and opposed to the negative composite layer 22. The direction orthogonal to the roll direction L and the width-wise direction W (roll axial direction) of the electrode body 12 is referred to as the thickness-wise direction of the electrode body 12. The positive plate 3 includes the insulation protective layer 34 disposed on the positive current collector 31. The insulation protective layer 34 is adjacent to the end of the positive composite layer 32 in the width-wise direction W (roll axial direction) of the electrode body 12 and is opposed to the negative composite layer 22 in the thickness-wise direction of the electrode body 12. In an example, the insulation protective layer 34 may be disposed on two parts of the positive current collector 31 adjacent to opposite ends of the positive composite layer 32 in the width-wise direction W of the electrode body 12. In an example, the insulation protective layer 34 may be disposed on the positive current collector 31 between the positive connector 33 and the positive composite layer 32 in the width-wise direction W of the electrode body 12. The insulation protective layer 34 is disposed to cover the exposed positive current collector 31.

Lamination Structure of Electrode Body 12

Figure 3:
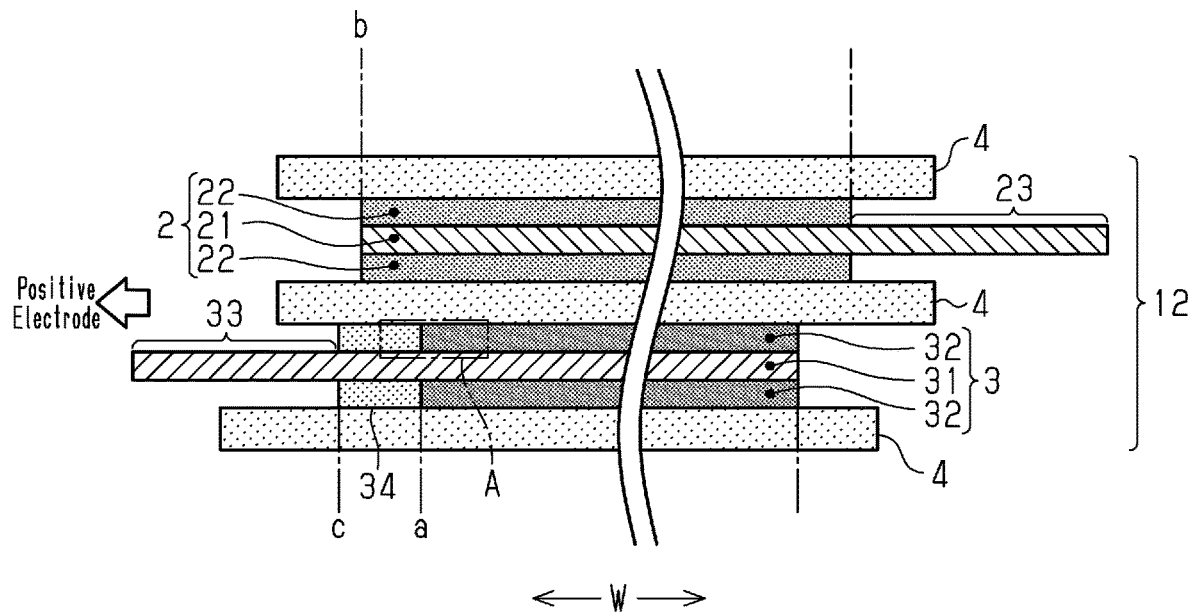
FIG. 3 is a cross-sectional partial view showing a schematic lamination structure of an electrode body in a lithium-ion rechargeable battery.

FIG. 3 is a cross-sectional partial view showing the schematic structure of the lamination of the electrode body 12 in the lithium-ion rechargeable battery 1. As shown in FIG. 2, the basic structure (lamination) of the electrode body 12 in the lithium-ion rechargeable battery 1 includes the negative plate 2, the positive plate 3, and the separator 4.

The negative plate 2 includes the negative composite layers 22 disposed on opposite surfaces of the negative current collector 21, which serves as a negative substrate. One end of the negative current collector 21 includes the negative connector 23 on which metal is exposed. More specifically, one end of the negative current collector 21 in the width-wise direction W of the electrode body 12 is used as the negative connector 23 on which metal is exposed.

The positive plate 3 includes the positive composite layers 32 disposed on opposite surfaces of the positive current collector 31, which serves as a positive substrate. One end of the positive current collector 31 includes the positive connector 33 on which metal is exposed. More specifically, the end of the positive current collector 31 opposite to the negative connector 23 of the negative current collector 21 in the width-wise direction W of the electrode body 12 is used as the positive connector 33.

The lamination is obtained by stacking the negative plate 2 and the positive plate 3 with the separator 4 disposed between the negative plate 2 and the positive plate 3. The lamination is rolled about the roll axis in the longitudinal direction and then is shaped to have a low profile. This forms the rolled-type electrode body 12.

In the present embodiment, the insulation protective layer 34 is disposed on the positive current collector 31 adjacent to the positive connector 33 of the positive composite layer 32. More specifically, in the present embodiment, the insulation protective layer 34 is disposed on the positive current collector 31 adjacent to the positive connector 33 of the positive current collector 31 in the width-wise direction W of the electrode body 12. As in the prior art, when the insulation protective layer 34 is not included, the positive current collector 31 is exposed from an end a of the positive composite layer 32 that is located toward the positive connector 33. In this case, from the end a to an end b of the negative composite layer 22 that is located at the positive electrode side, the positive current collector 31 and the negative composite layer 22 are opposed to each other via the separator 4. In this structure, metal particles may collect on this location, or dendrite of metal lithium (Li) may develop on the negative composite layer 22. If such substances pass through the separator 4, a short circuit may be formed between the negative composite layer 22 and the positive current collector 31. This causes heat generation and self-discharging. In the present embodiment, the insulation protective layer 34 is disposed from the end a to an end c, over the end b. The insulation protective layer 34 limits such short circuits.

Electrolytic Solution 13

The electrolytic solution 13 of the lithium-ion rechargeable battery 1 is nonaqueous and includes a composition in which a lithium salt is dissolved in an organic solvent. Examples of the lithium salt include $LiClO_4$, $LiPF_6$, $LiAsF_6$, $LiBF_4$, or $LiSO_3CF_3$. Examples of the organic solvent include cyclic carbonates such as ethylene carbonate, propylene carbonate, butylene carbonate and trifluoropropylene carbonate; chain carbonates such as diethyl carbonate, dimethyl carbonate, ethyl methyl carbonate, and dipropyl carbonate; ether compounds such as tetrahydrofuran, 2-methyltetrahydrofuran, and dimethoxyethane; sulfur compounds such as ethyl methyl sulfone and butane sultone; and phosphorus compounds such as triethyl phosphate and trioctyl phosphate. The electrolytic solution may be obtained by mixing one or more of the above elements. The composition of the electrolytic solution 13 is not limited to that described above.

Components of Electrode Body 12

The negative plate 2, the positive plate 3, and the separator 4 are the components of the electrode body 12 and will now be described.

In the present embodiment, the term "average size" refers to the median size (D50: 50% volume-average particle size)

corresponding to 50% of accumulation in a volume-based particle size distribution, unless otherwise specified. When the average particle size is in a range of approximately 1 μm or greater, a laser diffraction and light scattering process may be used to obtain the average particle size. When the average particle size is in a range of approximately 1 μm or less, a dynamic light scattering (DLS) process may be used to obtain the average particle size. The average particle size based on the DLS process may be measured in accordance with JISZ8828:2013.

Negative Plate 2

The negative plate 2 is obtained by forming the negative composite layers 22 on opposite surfaces of the negative current collector 21, which serves as the negative substrate. In the embodiment, the negative current collector 21 is formed of a copper (Cu) foil. The negative current collector 21 is a base as the aggregate for the negative composite layer 22 and is also a current collecting member that collects electricity from the negative composite layer 22. In the present embodiment, the negative active material is a material capable of storing and releasing lithium ions and is powder of a carbon material such as graphite.

The negative plate 2 is formed by, for example, mixing the negative active material, solvent, and binder, coating the negative current collector 21 with the mixed negative composite paste, and drying the negative composite paste.

Positive Plate 3

The positive plate 3 includes the positive current collector 31 and the positive composite layer 32 and the insulation protective layer 34 applied to the positive current collector 31.

Positive Current Collector 31

The positive plate 3 is obtained by forming the positive composite layers 32 on opposite surfaces of the positive current collector 31, which serves as the positive substrate. In the embodiment, the positive current collector 31 is formed of an aluminum (Al) foil. The positive current collector 31 is a base as the aggregate for the positive composite layer 32 and is also a current collecting member that collect electricity from the positive composite layer 32.

In the embodiment, the positive substrate forming the positive current collector 31 is formed of the Al foil. For example, the positive substrate forming the positive current collector 31 is formed of a conductive material including a metal having good conductivity. Examples of the conductive material may be a material including aluminum and a material including an aluminum alloy. The structure of the positive current collector 31 is not limited to that described above.

Positive Composite Layer 32

Figure 4:
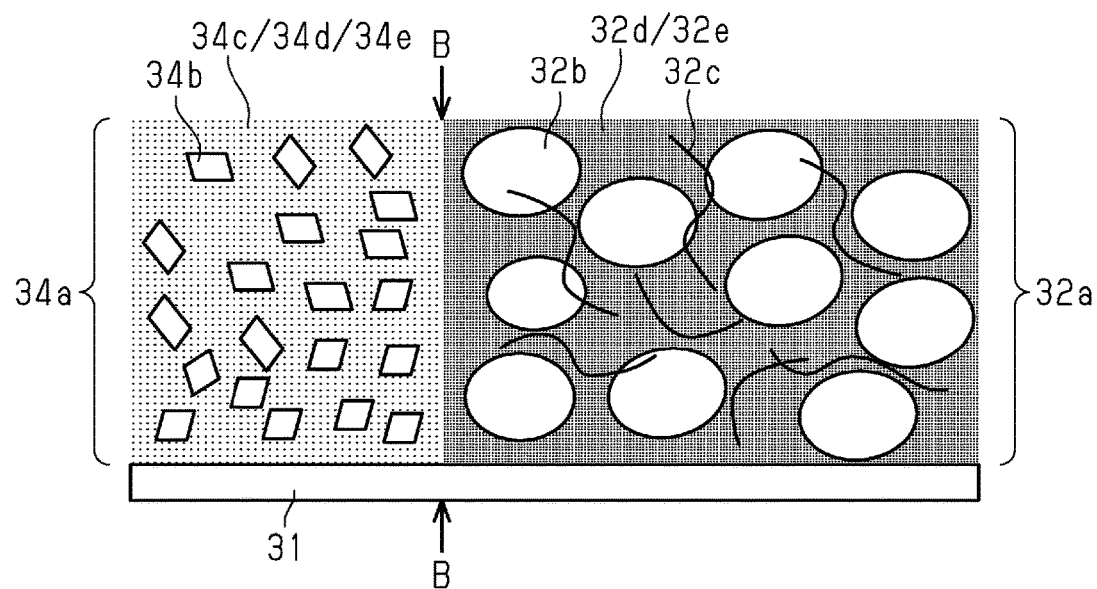
FIG. 4 is an enlarged schematic view of section A shown in FIG. 3 showing a boundary portion B between a positive composite layer and an insulation protective layer in a coating step of the embodiment.

FIG. 4 is an enlarged schematic diagram of section A shown in FIG. 3 showing the boundary portion B between the positive composite layer 32 and the insulation protective layer 34 in a coating step (S3) of the present embodiment. The positive composite layer 32 will be described with reference to FIG. 4. The positive composite layer 32 is obtained by coating the positive current collector 31 with the positive composite paste 32a and drying the positive composite paste 32a. The positive composite layer 32 includes the conduction support 32c, a binder 32d, and an additive agent such as a dispersant in addition to the positive active material particles 32b.

Positive Composite Paste 32a

The positive composite paste 32a is obtained by adding a solvent 32e to the conduction support 32c, the binder 32d, and the additive agent such as the dispersant in addition to the positive active material particles 32b to form a paste. In the coating step (S3) shown in FIG. 4, the positive composite paste 32a is applied to the positive current collector 31 to form the positive composite layer 32. Subsequently, in the drying step (S4), the positive composite paste 32a is dried and solidly adhered. At the stage of the positive composite paste 32a shown in FIG. 4, the solvent 32e is mixed with the positive composite paste 32a. However, after the drying step (S4), the solvent 32e is volatilized and disappeared from the positive composite layer 32.

Composition of Positive Active Material Particles 32b

The positive active material particles 32b include a primary particle that contains lithium-transition metal oxide having a layered crystalline structure. The lithium-transition metal oxide includes one or a predetermined number of transition metal elements in addition to Li. Preferably, the transition metal element included in the lithium-transition metal oxide is at least one of Ni, Co, and Mn. A preferred example of the lithium-transition metal oxide includes all of Ni, Co, and Mn.

The positive active material particles 32b may additionally include one or more kinds of elements other than a transition metal element (i.e., at least one of Ni, Co, and Mn). The additional element may include any element in the periodic table belonging to group 1 (alkali metals such as sodium), group 2 (alkaline earth metals such as magnesium and calcium), group 4 (transition metals such as titanium and zirconium), group 6 (transition metals such as chromium and tungsten), group 8 (transition metal such as iron), group 13 (semi-metal such as boron or metal such as aluminum), and group 17 (halogen such as fluorine).

In a preferred embodiment, the positive active material particles 32b may have the composition (average composition) expressed by the following general expression (1).

$$Li_{1+x}Ni_yCo_zMn_{(1-y-z)}MA\alpha MB\beta O_2 \qquad (1)$$

In expression (1), x may be a real number that is greater than or equal to 0 and less than or equal to 0.2, y may be a real number that is greater than 0.1 and less than 0.6, and z may be a real number that is greater than 0.1 and less than 0.6. In expression (1), MA represents at least one of metal elements selected from W, Cr, and Mo, and $\alpha$ is a real number that is greater than 0 and less than or equal to 0.01 (typically, greater than or equal to 0.0005 and less than 0.01, and, for example, greater than or equal to 0.001 and less than or equal to 0.01). In expression (1), MB represents one or more of elements selected from a group of Zr, Mg, Ca, Na, Fe, Zn, Si, Sn, Al, B, and F, and $\beta$ may be a real number that is greater than or equal to 0 and less than or equal to 0.01. Thus, $\beta$ may be substantially 0. That is, the oxide substantially does not contain MB. In a chemical formula representing the lithium-transition metal oxide having a layered structure, the composition ratio of oxygen (O) is set to 2 for the sake of convenience. However, the numerical value should not be interpreted in a strict manner and may allow slight variation in the composition (typically, in a range of 1.95 or greater and 2.05 or less).

Conduction Support 32c

The conduction support 32c is a material that forms a conductive path in the positive composite layer 32. An appropriate amount of the conduction support is mixed with the positive composite layer 32 to increase the conductivity of the positive electrode and improve the charging and discharging efficiency of the battery and the output performance of the battery. Examples of the conduction support 32c include carbon black such as acetylene black (AB) and other materials (e.g., graphite) and a carbon material such as a carbon nanotube. The average particle size of the conduction support 32c is, for example, 0.1 to 0.15 μm.

Binder 32d

In an example, polyvinylidene fluoride (PVdF), polytetrafluoroethylene (PTFE), polyacrylic acid, or polyacrylate may be used as the binder 32d.

Dispersant

Examples of the dispersant include polyvinyl alcohol (PVA), polyvinyl butyral (PVB), polyvinyl pyrrolidone (PVP), polyacrylate, polymethacrylate, polyoxyethylene alkyl ether, polyalkylene polyamine, and benzimidazole.

Structure of Insulation Protective Layer 34

As shown in FIG. 2, in the positive plate 3, the positive composite layer 32 is formed on the positive current collector 31, and the insulation protective layer 34 is also formed on the positive current collector 31 adjacent to the positive composite layer 32 at a position opposed to the end of the negative composite layer 22. More specifically, the insulation protective layer 34 is located adjacent to the end of the positive composite layer 32 in the width-wise direction W of the electrode body 12 and opposed to the end of the negative composite layer 22 in the thickness-wise direction of the electrode body 12. In the insulation protective layer 34, the insulation particles 34b are dispersed and stabilized by the binder 32d. The insulation protective layer 34 is obtained by coating the surface of the positive current collector 31 with the insulation protective paste 34a along ends of the positive composite layer 32 and drying the insulation protective paste 34a.

Insulation Protective Paste 34a

The insulation protective paste 34a is a paste obtained by liquidizing a binder 34c by adding a solvent 34d and dispersing the insulation particles 34b. In addition, a dispersant 34e is added to evenly disperse the insulation particles 34b in the paste.

In the coating step (S3) shown in FIG. 6, the insulation protective paste 34a is applied to the positive current collector 31. In the drying step (S4), the insulation protective paste 34a is dried and solidly adhered. This forms the insulation protective layer 34. At the stage of the insulation protective paste 34a shown in FIG. 5, the solvent 32e is mixed with the insulation protective paste 34a. After the dry step (S4), the solvent 32e is volatilized and disappeared from the insulation protective layer 34.

Insulation Particle 34b

The insulation particles 34b are located between the negative composite layer 22 and the positive current collector 31 for electrical insulation. Examples of the particles include an insulator such as boehmite or alumina. In the present embodiment, boehmite is used.

Boehmite

Boehmite is an aluminum hydroxide (γ-AlO(OH)) mineral and is a component of aluminum ore bauxite. The glassy property has pearl-like luster. Mohs hardness is 3 to 3.5. The specific gravity is 3.00 to 3.07. Boehmite has high insulating properties, high heat resistance, and high hardness and may be industrially used as an inexpensive flame-retardant additive for a fire-resistant polymer.

Boehmite is expressed by a chemical composition of AlO(OH) or $Al_2O_3 \cdot H_2O$. Boehmite is alumina monohydrate that is chemically stable and is typically produced by heating or hydrothermally treating alumina trihydrate in air. The dehydration temperature of boehmite is relatively high and is 450° C. to 530° C. The producing conditions may be adjusted to control the shape of boehmite into various shapes such as a plate, a needle, or a hexagonal plate. Adjustment of the producing conditions also controls the aspect ratio and the particle size.

There are various conventional processes for producing boehmite. Typically, boehmite is produced by performing a hydrothermal treatment on aluminum hydroxide derived from bauxite, which is the raw material. The producing process includes a step of stirring and mixing a slurry obtained by adding water to aluminum hydroxide and a reaction accelerator (metal compound). The producing process also includes a hydrothermal treatment step of wet-curing the slurry while heating the slurry in a steam atmosphere with a pressure vessel. The producing process also includes a dehydrating step, a washing step, a filtering step, and a drying step of the product obtained by the reaction.

Particle Size of Insulation Particle 34b

As described above, an excessively large average particle size [μm (D50)] adversely affects the dispersion properties. On other hand, an excessively small average particle size [μm (D50)] causes aggregation. In the present embodiment, the average particle size [μm (D50)] is set to 1 to 3 μm to inhibit aggregation.

Binder 34c

In an example, polyvinylidene fluoride (PVdF), polytetrafluoroethylene (PTFE), polyacrylic acid, or polyacrylate may be used as the binder 34c.

Separator 4

The separator 4 may be a porous resin sheet formed from resin such as polyethylene (PE) or polypropylene (PP) that retains the electrolytic solution 13 between the positive plate 3 and the negative plate 2. The porous resin sheet may have a single-layer structure that individually uses various materials or a multi-layer structure that combines various materials.

Manufacturing Method of Positive Plate 3

FIG. 6 is a flowchart showing a method for manufacturing the positive plate 3 in the present embodiment. The method for manufacturing the positive plate 3 of the present embodiment will now be described with reference to FIG. 6.

Positive Composite paste Producing Step (S1)

Firstly, the positive composite paste 32a is produced. The detail has been described above.

Insulation Protective Paste Producing Step (S2)

The insulation protective paste 34a is also produced. The detail has been described above.

Coating Step (S3)

The coating step (S3) will now be described. The coating step (S3) is a step of simultaneously applying the positive composite paste 32a produced in the positive composite paste producing step (S1) and the insulation protective paste 34a produced in the insulation protective paste producing step (S2) to predetermined positions of the positive current collector 31.

Structure of Coater 5

Figure 7:
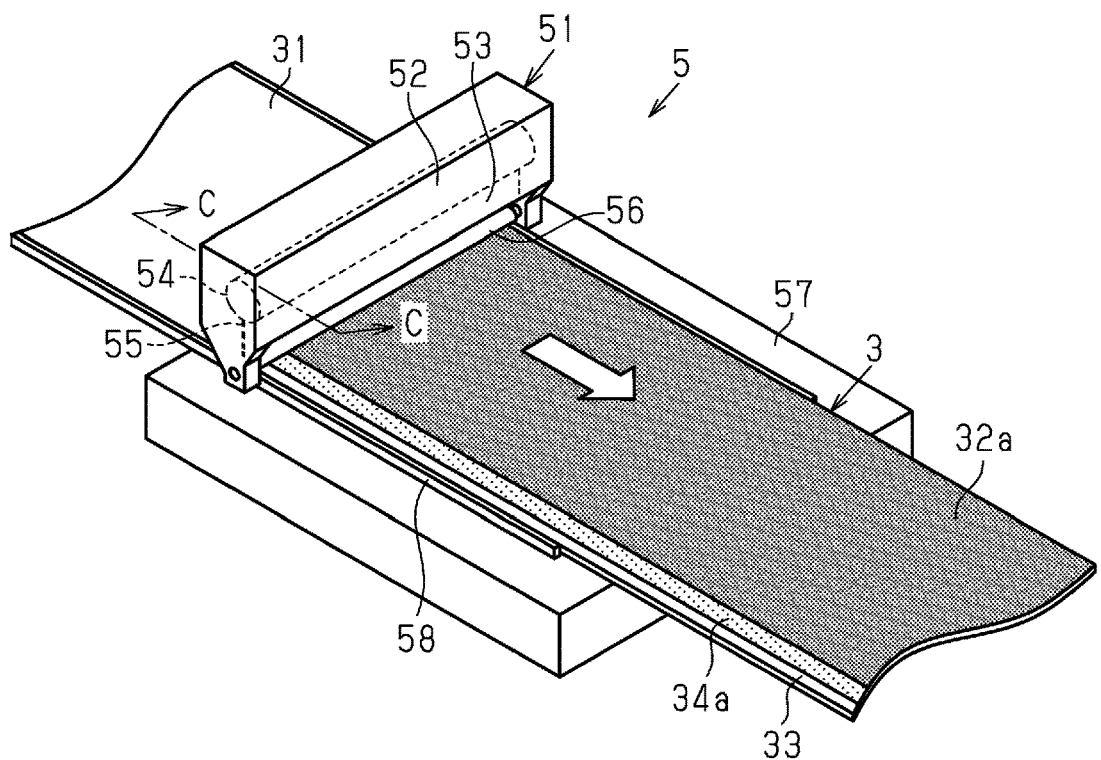
FIG. 7 is a perspective view showing the coating step.
Figure 8:
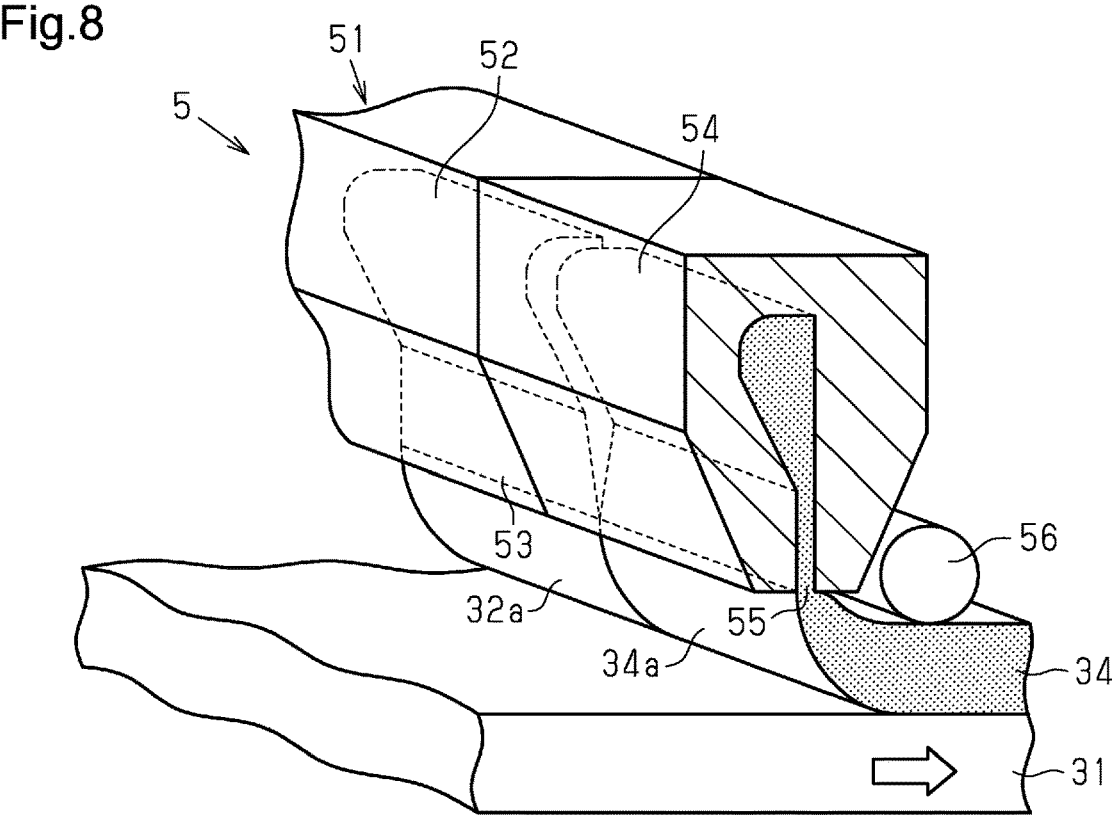
FIG. 8 is a schematic perspective view showing a first nozzle and a second nozzle including a cross section of a coater as viewed from C-C line in FIG. 7.

FIG. 7 is a perspective view showing the coating step. FIG. 8 is a schematic perspective view showing a first nozzle 53 and a second nozzle 55 including a cross section of the coater 5 as viewed from C-C line in FIG. 7. The coater 5 will now be described with reference to FIGS. 7 and 8.

As shown in FIG. 7, the coater 5 includes a stage 57 serving as a base. The stage 57 includes a positioning guide 58 used to convey the positive current collector 31 that is formed of an Al foil and is belt-shaped before being cut. The positive current collector 31 is drawn out from a supply reel (not shown) and is conveyed on the stage 57 by a conveying means. A gate-type die nozzle 51 is disposed on an upstream end of the stage 57 in a conveyance direction of the positive current collector 31 and extends over the positive current collector 31 in a direction orthogonal to the conveyance direction. The die nozzle 51 includes a first die 52 that stores the positive composite paste 32*a*. The first die 52 is a cavity located at a position corresponding to the position where the positive composite layer 32 is formed. The positive composite paste 32*a* is supplied from a supplying means (not shown) and is stored in the first die 52. A second die 54 is a cavity located at a position corresponding to the position where the insulation protective layer 34 is formed. The insulation protective paste 34*a* is supplied from a supplying means (not shown) and is stored in the second die 54. The first die 52 and the second die 54 are collinearly arranged adjacent to each other.

The first nozzle 53 extends from a lower portion of the first die 52 to the position where the positive composite layer 32 of the positive current collector 31 is formed on the stage 57. When the pressure of the first die 52 is increased by a pressure-applying means (not shown), a predetermined amount of the positive composite paste 32*a* is discharged from the first nozzle 53 to the position where the positive composite layer 32 of the positive current collector 31 is formed.

The second nozzle 55 extends from a lower portion of the second die 54 to the position where the insulation protective layer 34 of the positive current collector 31 is formed on the stage 57. When the pressure of the second die 54 is increased by a pressure-applying means (not shown), a predetermined amount of the insulation protective paste 34*a* is discharged from the second nozzle 55 to the position where the insulation protective layer 34 of the positive current collector 31 is formed.

As shown in FIG. 8, the first nozzle 53 and the second nozzle 55 are separated from each other. The positive composite paste 32*a* discharged from the first nozzle 53 intimately comes into liquid contact with the insulation protective paste 34*a* discharged from the second nozzle 55 immediately after being discharged. The positive composite paste 32*a*, which is in liquid contact with the insulation protective paste 34*a*, is applied to the position where the positive composite layer 32 of the positive current collector 31 is formed. Also, the insulation protective paste 34*a*, which is in liquid contact with the positive composite paste 32*a*, is applied to the position where the insulation protective layer 34 of the positive current collector 31 is formed. After being applied, the surfaces of the positive composite layer 32 and the insulation protective layer 34 are reshaped by a roller 56. The insulation protective layer 34 has a smaller thickness than the positive composite layer 32. Hence, only the positive composite layer 32 is reshaped.

Electrode Body 12 After Coating Step (S3)

Figure 5:
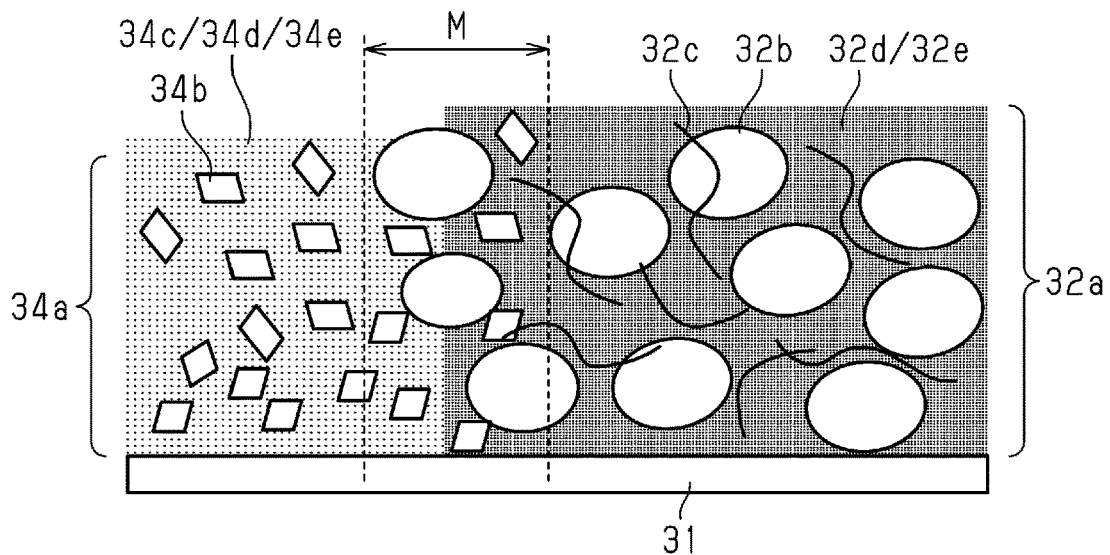
FIG. 5 is a diagram showing a state including a mixture layer M changed formed the state shown in FIG. 4.

In the coating step (S3) of the present embodiment shown in FIG. 6, the liquid contact state of the positive composite layer 32 with the insulation protective layer 34 in the boundary portion B will be described. FIG. 5 is a diagram showing the mixture layer M formed in the state shown in FIG. 4. As shown in FIG. 5, when the positive composite paste 32*a* and the insulation protective paste 34*a* are in liquid contact, the positive composite paste 32*a* and the insulation protective paste 34*a* are mixed to form the mixture layer M.

Boundary Portion B and Mixture Layer M in Coating Step (S3)

The boundary portion B between the positive composite layer 32 and the insulation protective layer 34 and the mixture layer M after the coating step (S3) will now be described in detail.

Figure 9A:
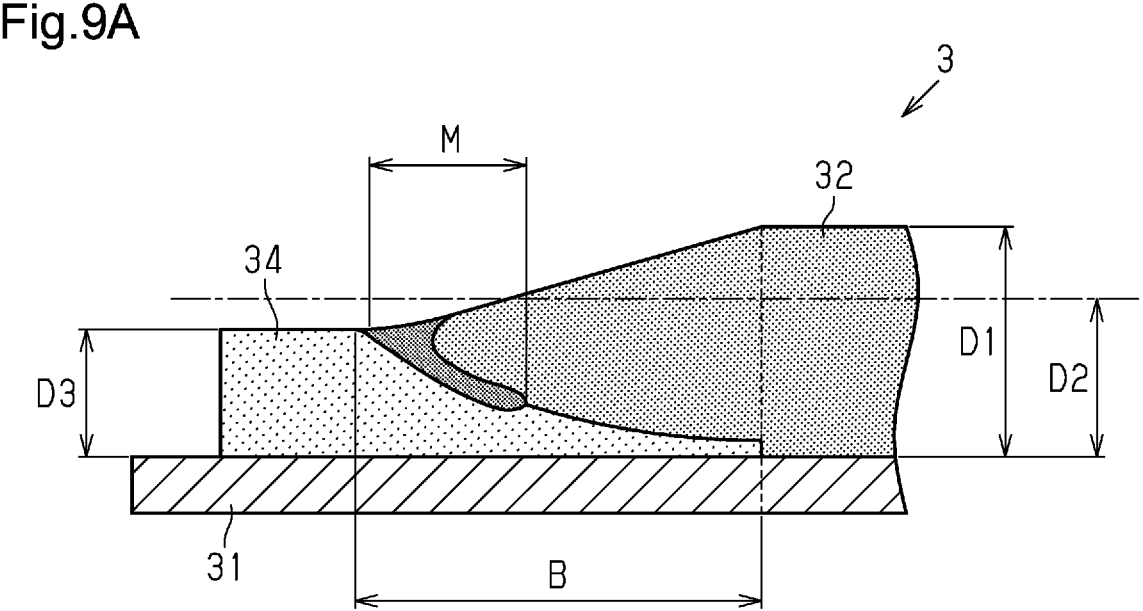
FIG. 9A is a schematic diagram showing the boundary portion in which a positive composite layer overlaps an insulation protective layer before a pressing step.
Figure 10A:
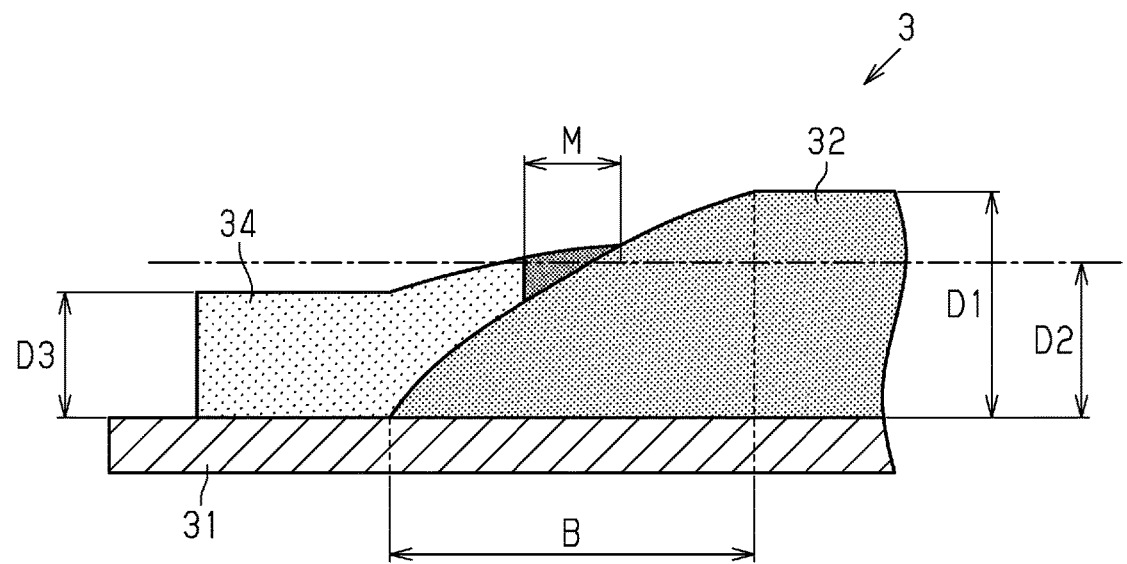
FIG. 10A is a schematic diagram showing the boundary portion in which the insulation protective layer overlaps the positive composite layer before the pressing step.

FIG. 9A is a schematic diagram of the boundary portion B and the mixture layer M after the coating step (S3) and before the pressing step (S5) when the positive composite layer 32 overlaps the insulation protective layer 34 in the boundary portion B. FIG. 10A is a schematic diagram of the boundary portion B and the mixture layer M after the coating step (S3) and before the pressing step (S5) when the insulation protective layer 34 overlaps the positive composite layer 32 in the boundary portion B.

FIGS. 4 and 5 show the electrode body 12 after the coating step (S2) in which the boundary portion B between the positive composite layer 32 and the insulation protective layer 34 is simplified and indicated by vertical surfaces in liquid contact.

However, instead of the vertical surfaces in liquid contact, the positive composite layer 32 may overlap the insulation protective layer 34 or the insulation protective layer 34 may overlap the positive composite layer 32 in the boundary portion B after the coating step (S3) depending on the conditions such as the viscosity of the positive composite paste 32*a*, the viscosity of the insulation protective paste 34*a*, and the amount, pressure, and speed of discharges from the first nozzle 53 and the second nozzle 55.

In FIG. 4, the boundary portion B is indicated as the surface orthogonal to a plane on which the positive composite layer 32 extends. However, in a case as shown in FIG. 9A, the boundary portion B is a portion in which the positive composite layer 32 and the insulation protective layer 34 overlap. Also, in a case shown in FIG. 10A, the boundary portion B is a portion in which the positive composite layer 32 and the insulation protective layer 34 overlap.

In the boundary portion B, the positive composite layer 32 is in liquid contact with the insulation protective layer 34. As shown in FIG. 5, the mixture layer M is formed in the surfaces of the positive composite layer 32 and the insulation protective layer 34 that are in liquid contact with each other.

Drying Step (S4)

As described above, after the coating step (S3), when the positive composite paste 32*a* and the insulation protective paste 34*a* are mixed and form the mixture layer M, the drying step (S4) is performed. The drying step (S4) volatilizes the solvent 32*e* of the positive composite layer 32 and solidifies the paste of the positive composite layer 32. Consequently, the positive composite layer 32 does not further mix with the insulation protective layer 34. The drying step (S4) also volatilizes the solvent 34*d* of the insulation protective layer 34 and solidifies the paste of the insulation protective layer 34. Consequently, the insulation protective layer 34 does not further mix with the positive composite layer 32. The insulation protective layer 34 and the positive composite layer 32 are stable in this state.

Pressing Step (S5)

When the drying step is completed, the positive composite layer 32 and the insulation protective layer 34 each have a certain hardness. However, in the pressing step (S5), a pressing machine (not shown) is used to reshape the surfaces so that the surfaces are flattened and have a predetermined thickness. After the drying step (S4), the thickness of the insulation protective layer 34 remains smaller than the thickness of the positive composite layer 32. As a result, in the pressing step (S5), only the positive composite layer 32 is reshaped by the pressing machine.

Electrode Body 12 After Pressing Step (S5)

Figure 11:
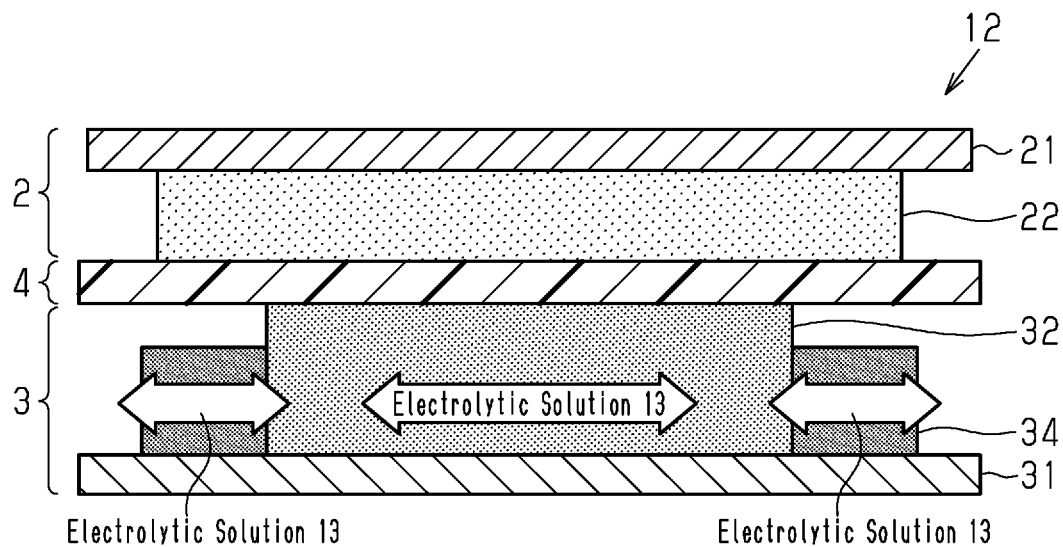
FIG. 11 is a schematic diagram of the electrode body in the present embodiment after the pressing step.

FIG. 11 is a schematic diagram of the electrode body 12 in the present embodiment after the pressing step (S5). In the pressing step (S5), the positive composite layer 32 is compressed so that the porosity P [%] is decreased to 30% to 50%. In the pressing step (S5), the insulation protective layer 34 is not compressed. The porosity P [%] of the insulation protective layer 34 is maintained at 45% to 65% and remains relatively large. In the present embodiment, the porosity P [%] of the insulation protective layer 34 is adjusted to be greater than the porosity P [%] of the positive composite layer 32.

Also, the thickness of the insulation protective layer 34 is smaller than the thickness of the positive composite layer 32. Thus, the positive composite layer 32 is in contact with the separator 4, whereas the insulation protective layer 34 is spaced apart by a gap from the separator 4.

Compression in Pressing Step (S5)

The boundary portion B between the positive composite layer 32 and the insulation protective layer 34 and the mixture layer M after the pressing step (S5) will now be described in detail.

Figure 9B:
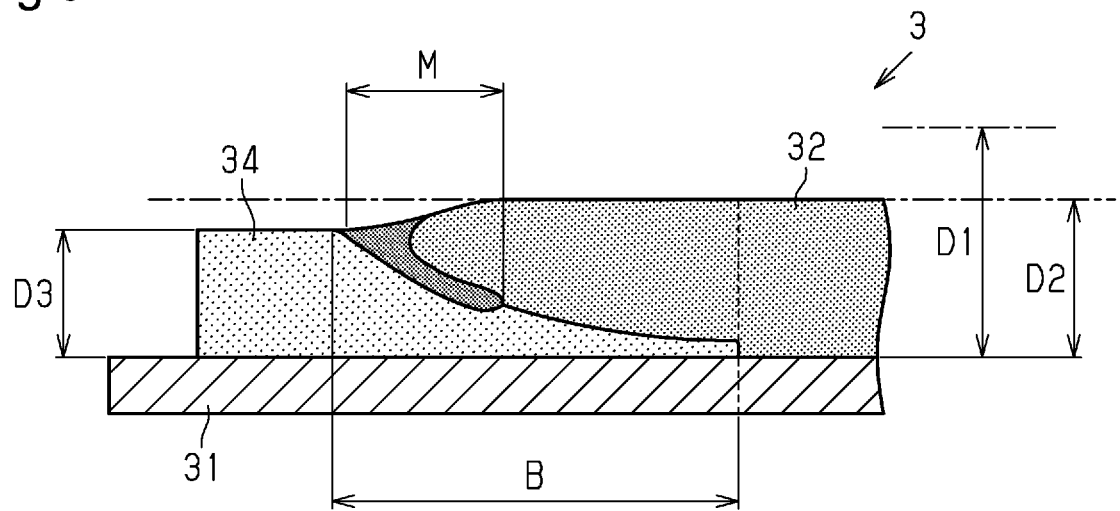
FIG. 9B is a schematic diagram showing the boundary portion in which the positive composite layer overlaps the insulation protective layer after the pressing step.

FIG. 9B is a schematic diagram of the boundary portion B and the mixture layer M after the pressing step (S5) when the positive composite layer 32 overlaps the insulation protective layer 34 in the boundary portion B as shown in FIG. 9A.

Figure 10B:
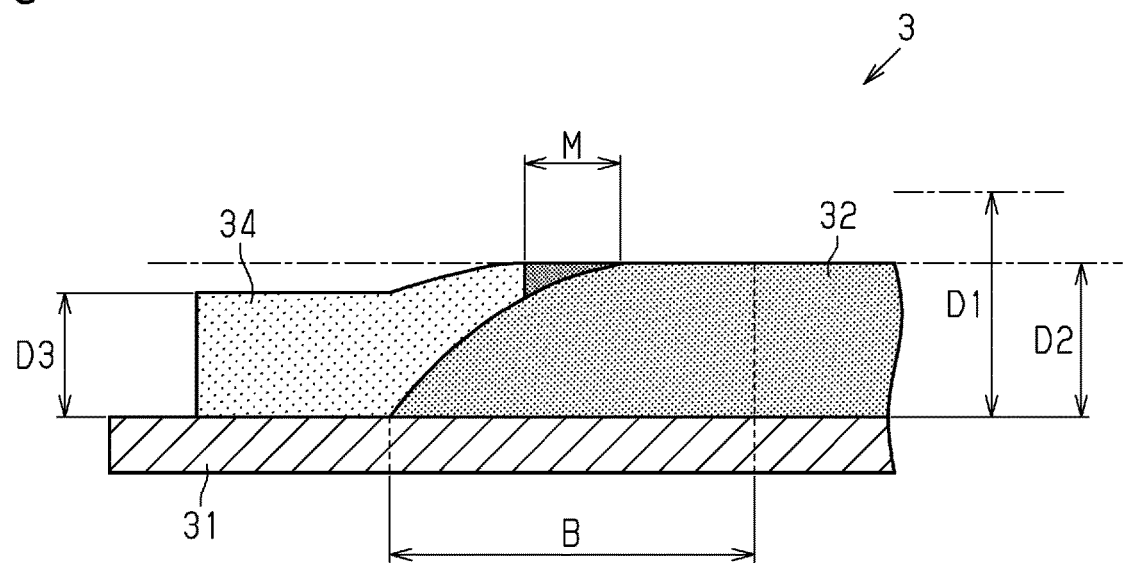
FIG. 10B is a schematic diagram showing the boundary portion in which the insulation protective layer overlaps the positive composite layer after the pressing step.

FIG. 10B is a schematic diagram of the boundary portion B and the mixture layer M after the pressing step (S5) when the insulation protective layer 34 overlaps the positive composite layer 32 in the boundary portion B as shown in FIG. 10A.

As described above, the positive composite layer 32 and the insulation protective layer 34 have two types of vertical positional relationship in the boundary portion B.

Positive Composite layer 32 Overlapping Insulation Protective Layer 34

As shown in FIG. 9A, before the pressing step (S5), the positive composite layer 32 overlaps the insulation protective layer 34 in the boundary portion B. The positive composite layer 32 has the thickness D1. In the coating step (S3), the positive composite paste 32a and the insulation protective paste 34a are mixed to form the mixture layer M in the boundary portion B. The positive composite layer 32 and at least a portion of the mixture layer M in which the positive composite paste 32a is mixed with the insulation protective paste 34a are pressed together to the thickness D2. However, in this step, the positive composite layer 32 and at least a portion of the mixture layer M are not compressed to the thickness 3D of the insulation protective layer 34. The compression of the positive composite layer 32 improves the porosity P [%] in the positive composite layer 32, which decreases the distance between the positive active material particles 32b and obtains a satisfactory conductive path. In contrast, the insulation protective layer 34 is not compressed so that the permeability of the electrolytic solution 13 will not be adversely affected by a decrease in the distance between the insulation particles 34b that occurs if compressed.

In this step, the insulation protective paste 34a and the positive composite paste 32a, which have been applied, are mixed and form the mixture layer M in the boundary portion B. The mixture layer M contains the positive active material particles 32b even though the content rate of the positive active material particles 32b in the mixture layer M is lower than the content rate of the positive active material particles 32b in the positive composite layer 32. It is desirable that the positive active material particles 32b in the mixture layer M be used. In the mixture layer M, the distance between the positive active material particles 32b is relatively large. When the porosity P [%] is decreased by compressing the mixture layer M, the positive active material particles 32b will become usable and contribute to the battery efficiency.

In this regard, in the pressing step (S5), the positive composite layer 32 and at least a portion of the mixture layer M are pressed together from the thickness D1, which is shown in FIG. 9A, to the thickness D2. Thus, the mixture layer M is also compressed. The compression to the thickness D2 does not compress the insulation protective layer 34 having the thickness D3 and does not decrease the porosity P [%] of the insulation protective layer 34.

Insulation Protective Layer 34 Overlapping Positive Composite layer 32

The pressing step (S5), when the insulation protective layer 34 overlaps the positive composite layer 32 in the boundary portion B as shown in FIG. 10A, will now be described. The pressing step (S5) is basically the same as when the positive composite layer 32 overlaps the insulation protective layer 34 in the boundary portion B as shown in FIG. 9A. More specifically, in the pressing step (S5), the positive composite layer 32 and at least a portion of the mixture layer M are pressed together from the thickness D1, which is shown in FIG. 10A, to the thickness D2. Thus, the mixture layer M is also compressed. The compression to the thickness D2 does not compress the insulation protective layer 34 having the thickness D3 and does not decrease the porosity P [%] of the insulation protective layer 34.

Cutting Step (S6)

After the surfaces are flattened and have a uniform thickness in the pressing step (S5), the cutting step (S6) performs cutting to obtain a length corresponding to the electrode body 12.

Thus, the positive plate 3 is completed.

Manufacturing Method of Vehicle Battery Pack

When the positive plate 3 is completed through the manufacturing method of the positive plate 3, the negative plate 2 and the positive plate 3 are stacked on one another with the separator 4 disposed between the negative plate 2 and the positive plate 3 to form a lamination, and the lamination is rolled to manufacture the electrode body 12. Subsequently, the positive external terminal 14 and the negative external terminal 15 are coupled to the electrode body 12 through a lid of the battery case 11. The electrode body 12 is accommodated in the battery case 11, and the lid is hermetically joined to by laser beam welding or the like. After a drying step, in a solution adding step, the battery case 11 is filled with the electrolytic solution 13, and the battery case 11 is sealed. Subsequently, conditioning such as initial charging, an open circuit voltage (OCV) test, an internal resistance test, and aging are performed. Thus, a cell battery is completed. Two or more cell batteries are stacked to form an assembled battery. Further, two or more assembled batteries are accommodated in a battery pack. When the battery pack is provided with a controller that performs control by monitoring charging and discharging and the like, the battery pack is completed as a vehicle on-board lithium-ion rechargeable battery.

Operation of Present Embodiment

With the structure of the present embodiment, the insulation protective layer 34 has a larger porosity P [%] than the positive composite layer 32. Thus, the flow of the electrolytic solution 13 is not hindered during the high-rate charging and discharging. The mixture layer M is pressed to decrease the porosity P [%]. Thus, the positive active material particles 32*b* are used. These structures effectively limit high-rate deterioration, thereby improving the battery efficiency.

Effects of Present Embodiment (1) In the present embodiment, the positive plate 3 includes the positive current collector 31, the positive composite layer 32 containing the positive active material particles 32*b*, and the insulation protective layer 34 disposed adjacent to the positive composite layer 32. The insulation protective layer 34 contains the insulation particles 34*b* and the binder 34*c*.

The insulation protective layer 34 is effective in limiting a short circuit of the positive current collector 31 and the negative composite layer 22 caused by lithium deposition.

The porosity P [%] of the insulation protective layer 34 is greater than the porosity P [%] of the positive composite layer 32. Thus, movement of ions in the electrolytic solution 13 of the positive composite layer 32 is less likely to be hindered by the insulation protective layer 34.

Accordingly, the concentration of the electrolytic solution 13 is less likely to become uneven in the cell battery during the high-rate charging and discharging. This effectively limits the high-rate deterioration.

(2) In the present embodiment, the porosity P [%] of the insulation protective layer 34 is set to 45% to 65%. The porosity P [%] of the positive composite layer 32 is set to 30% to 50%.

Thus, the positive composite layer 32 obtains a satisfactory conductive path of the positive active material particles 32*b*. Also, the insulation protective layer 34 allows the electrolytic solution 13 to easily move through.

Accordingly, the concentration of the electrolytic solution 13 is less likely to become uneven in the cell battery during the high-rate charging and discharging. This effectively limits the high-rate deterioration.

(3) In the present embodiment, the insulation particles 34*b* are formed of boehmite or alumina.

These materials are inexpensive and are easy to obtain. The materials are also effective in maintaining a stable insulating property of the insulation protective layer 34.

(4) In the present embodiment of the method for manufacturing the positive plate 3 of the lithium-ion rechargeable battery 1, the insulation protective paste 34*a* includes the insulation particles 34*b*, the binder 34*c*, the solvent 34*d*. The positive composite paste 32*a* includes the positive active material particles 32*b*, the conduction support 32*c*, the binder 32*d*, and the solvent 32*e*. In the coating step (S3), the positive composite paste 32*a* and the insulation protective paste 34*a* are simultaneously applied to the surface of the positive current collector 31 using the die nozzle 51. The simultaneous coating forms the positive composite layer 32 and the insulation protective layer 34 located adjacent to each other.

This is effective in easily and quickly performing the manufacturing process of the positive plate 3. In addition, the thicknesses of the positive composite layer 32 and the insulation protective layer 34 are strictly adjusted.

(5) In the present embodiment, the thickness 3D of the insulation protective paste 34*a* applied in the coating step (S3) is set to be smaller than the thickness D2 of the positive composite layer 32 after the pressing step (S5).

Thus, the positive composite layer 32 is compressed to obtain a satisfactory conductive path of the positive active material particles 32*b*.

Meanwhile, in the pressing step (S5), the insulation protective layer 34 is not compressed, and the porosity P [%] of the insulation protective layer 34 is not decreased. Thus, the insulation protective layer 34 allows the electrolytic solution 13 to easily move through.

In addition, the insulation protective layer 34 is spaced apart by a gap from the separator 4. The gap allows the electrolytic solution 13 to flow to the positive composite layer 32.

Accordingly, the concentration of the electrolytic solution 13 is less likely to become uneven in the cell battery during the high-rate charging and discharging. This effectively limits the high-rate deterioration.

(6) In the present embodiment, the positive composite paste 32*a* and the insulation protective paste 34*a* overlap to form the boundary portion B. In the boundary portion B, the positive composite paste 32*a* and the insulation protective paste 34*a* are mixed to form the mixture layer M. In the pressing step (S5), at least a portion of the mixture layer M is pressed to the thickness D2 together with the positive composite layer 32 having the thickness D1. At this time, the insulation protective layer 34 having the thickness D3 is not compressed.

As a result, the porosity P [%] of the positive active material particles 32*b* contained in the mixture layer M is decreased to obtain a satisfactory conductive path. Thus, the positive active material particles 32*b* contained in the mixture layer M effectively contribute to the battery efficiency.

Modified Examples

The embodiment described above is an example of the present disclosure and may be modified as follows.

In the present embodiment, the lithium-ion rechargeable battery 1, which is a flat cell battery for a vehicle on-board use, is described as an example of a nonaqueous electrolyte rechargeable battery. Alternatively, a nonaqueous electrolyte rechargeable battery may have a different shape such as a cylindrical shape and may be for another use such as a stationary use. The electrode body 12 is not limited to a low-profile rolled electrode body and may be obtained by stacking rectangular plates of electrodes. The shapes of the positive external terminal 14 and the negative external terminal 15 are not limited to those described.

The drawings are intended to illustrate the present embodiment and have not necessarily been drawn to scale. The present invention is not limited to the drawings. For example, the positive composite layer 32 including the mixture layer M is pressed so that the thickness changes from the thickness D1 to the thickness D2 in relation to the thickness D3 of the insulation protective layer 34. In this case, as long as the thickness D2 does not become smaller than the thickness D3, the thickness D2 may become close to the thickness D3 so that the mixture layer M is effectively compressed.

The flowchart shown in FIG. 6 is an example of the present disclosure. Steps may be added, removed, reordered, and switched. In an example, the drying step (S4) may be performed after the pressing step (S5).

The numerical values and the ranges are examples and may be optimally modified by one skilled in the art.

The compositions of the positive composite paste 32*a* and the insulation protective paste 34*a* and the properties of materials are examples of the present disclosure and may be optimally modified by one skilled in the art.

The "simultaneous coating" in the coating step (S3) does not necessarily have to be exact simultaneous coating as long as the objects of the present disclosure are achieved. For example, the first nozzle 53 and the second nozzle 55 may be misaligned in the conveyance direction.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A nonaqueous electrolyte rechargeable battery, comprising:
 a positive plate;
 a negative plate;
 a separator that insulates the positive plate from the negative plate; and
 a nonaqueous electrolytic solution, wherein
 the positive plate includes a positive current collector, a positive composite layer disposed on a portion of a surface of the positive current collector and containing a positive active material particle, and an insulation protective layer disposed on another portion of the surface of the positive current collector adjacent to the positive composite layer and containing an insulation particle,
 the insulation protective layer has a smaller thickness than the positive composite layer, and
 the insulation protective layer has a greater porosity than the positive composite layer,
 wherein,
 the positive composite layer and the insulation protective layer overlap to define a boundary portion,
 the nonaqueous electrolyte rechargeable battery, further comprising a mixture layer in which the positive composite layer and the insulation protective layer are mixed in the boundary portion,
 at least a portion of the mixture layer is compressed,
 the porosity of the insulation protective layer is 45% to 65%, and
 the porosity of the positive composite layer is 30% to 50%.

2. The nonaqueous electrolyte rechargeable battery according to claim 1, wherein the insulation particle includes boehmite or alumina.

3. A method for manufacturing a positive plate of a nonaqueous electrolyte rechargeable battery, wherein
 the nonaqueous electrolyte rechargeable battery includes the positive plate, a negative plate, a separator insulating the positive plate from the negative plate, and a nonaqueous electrolytic solution,
 the positive plate includes a positive current collector, a positive composite layer disposed on a portion of a surface of the positive current collector and containing a positive active material particle, and an insulation protective layer disposed on another portion of the surface of the positive current collector adjacent to the positive composite layer,
 the insulation protective layer has a smaller thickness than the positive composite layer, and
 the insulation protective layer has a greater porosity than the positive composite layer, the method comprising:
 coating, simultaneously, the surface of the positive current collector with an insulation protective paste including an insulation particle, a binder, and a solvent and a positive composite paste including a positive active material particle, a conduction support, a binder, and a solvent using a nozzle, thereby forming the positive composite layer and the insulation protective layer disposed adjacent to each other; and
 pressing the positive composite layer, wherein the insulation protective paste coated in the coating is set to have a smaller thickness than the positive composite layer after the pressing,
 wherein
 the positive composite layer and the insulation protective layer overlap to define a boundary portion,
 the positive composite paste is mixed with the insulation protective paste to form a mixture layer in the boundary portion,
 the pressing includes pressing the positive composite layer and at least a portion of the mixture layer together without compressing the insulation protective layer,
 the porosity of the insulation protective layer is 45% to 65%, and
 the porosity of the positive composite layer is 30% to 50%.

* * * * *